United States Patent
Cook et al.

(10) Patent No.: US 9,955,672 B2
(45) Date of Patent: May 1, 2018

(54) INFRARED THERMOGRAPHY AND BEHAVIOUR INFORMATION FOR IDENTIFICATION OF BIOLOGICALLY IMPORTANT STATES IN ANIMALS

(71) Applicants: Nigel Cook, Lacombe (CA); Clover Bench, Edmonton (CA); Allan Schaefer, Lacombe (CA)

(72) Inventors: Nigel Cook, Lacombe (CA); Clover Bench, Edmonton (CA); Allan Schaefer, Lacombe (CA)

( * ) Notice: Subject to any disclaimer, the term of this patent is extended or adjusted under 35 U.S.C. 154(b) by 0 days. days.

(21) Appl. No.: 14/306,035

(22) Filed: Jun. 16, 2014

(65) Prior Publication Data
US 2015/0359200 A1    Dec. 17, 2015

(51) Int. Cl.
*G06K 9/00*    (2006.01)
*A01K 29/00*    (2006.01)

(52) U.S. Cl.
CPC ........ *A01K 29/005* (2013.01); *G06K 9/00369* (2013.01)

(58) Field of Classification Search
CPC .............. A01K 29/005; G06K 9/00369; H04L 2025/03732; H04L 2025/03745;
(Continued)

(56) References Cited

U.S. PATENT DOCUMENTS 5,272,340 A * 12/1993 Anbar ................ G01J 3/32
                                              250/330
5,474,085 A    12/1995 Hurnik et al.
(Continued)

FOREIGN PATENT DOCUMENTS

CA    2234953 A1    4/1997
CA    2525676 A1    12/2004
(Continued)

OTHER PUBLICATIONS

Febrer et al. "Forced to crowd or choosing to cluster? Spatial distribution indicates social attraction in broiler chickens", Oct. 5, 2006, The Association for the Study of Animal Behaviour, Elsevier, pp. 1291-1300.*

(Continued)

*Primary Examiner* — Manuchehr Rahmjoo
(74) *Attorney, Agent, or Firm* — Marsh Fischmann & Breyfogle LLP; Jonathon A. Szumny

(57) ABSTRACT

Real-time automated, non-invasive infrared thermography information of a group of animals to be used for both thermal and behavioral measurement, thereby providing an earlier and more accurate predictor of onset of disease, growth states, or reproductive states in an animal within the group. More specifically, the present system and method provide for the use of thermal images to obtain both temperature and behavioral information about one or more animals at a time, and to utilize that information to determine the health, growth, or reproductive state of the animal. The combination of thermal biometric data, such as radio frequency identification infrared thermography, and behavioral biometric information, such as grouping behavior can be used to detect early-onset of biological states in animals.

13 Claims, 8 Drawing Sheets

Figure 1:
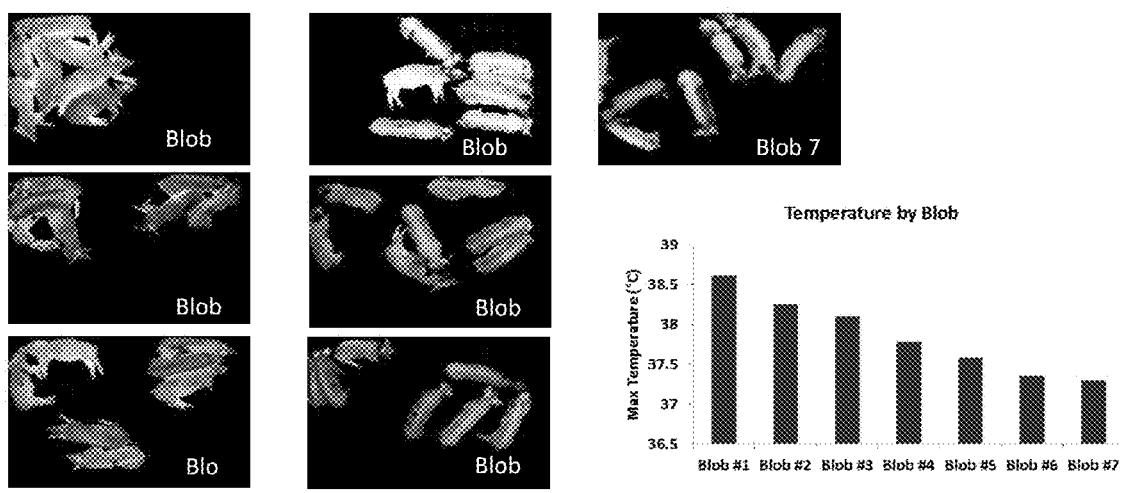

(58) Field of Classification Search
CPC ......... H04L 2025/0377; H04L 25/0222; H04L 25/0228; H04L 25/0244; H04L 25/03159
See application file for complete search history.

(56) References Cited

U.S. PATENT DOCUMENTS

| | | | |
|---|---|---|---|
| 5,595,444 A | 1/1997 | Tong et al. | |
| 6,375,612 B1 | 4/2002 | Guichon et al. | |
| 6,974,373 B2 | 12/2005 | Kriesel | |
| 7,026,941 B1 | 4/2006 | Anderson | |
| 2002/0010390 A1* | 1/2002 | Guice | A01K 11/008 600/300 |
| 2004/0019269 A1* | 1/2004 | Schaefer | G01N 25/72 600/407 |
| 2004/0052730 A1* | 3/2004 | Hochman | C12Q 1/02 424/9.2 |
| 2004/0154550 A1* | 8/2004 | McQuilkin | A61B 5/0059 119/174 |
| 2004/0245477 A1* | 12/2004 | Matsuda | A01K 29/005 250/458.1 |
| 2005/0257748 A1* | 11/2005 | Kriesel | A01K 11/008 119/51.02 |
| 2007/0093965 A1* | 4/2007 | Harrison | A01K 29/005 702/19 |
| 2007/0276270 A1* | 11/2007 | Tran | A61B 8/565 600/508 |
| 2008/0001735 A1* | 1/2008 | Tran | G06F 19/3418 340/539.22 |
| 2009/0252682 A1* | 10/2009 | Hillman | A61B 5/0059 424/9.1 |
| 2009/0312660 A1* | 12/2009 | Guarino | A61B 5/08 600/529 |
| 2010/0036277 A1 | 2/2010 | Austin | |
| 2010/0154722 A1* | 6/2010 | Van Den Berg | A01K 11/008 119/720 |
| 2010/0172567 A1* | 7/2010 | Prokoski | A61B 5/0064 382/132 |
| 2010/0332140 A1* | 12/2010 | Joyce | A01K 5/0114 702/19 |
| 2013/0064432 A1* | 3/2013 | Banhazi | G06T 7/0083 382/110 |
| 2013/0116573 A1* | 5/2013 | Herman | A61B 5/0064 600/474 |
| 2014/0015945 A1 | 1/2014 | Bench et al. | |

FOREIGN PATENT DOCUMENTS

| | | | |
|---|---|---|---|
| JP | 2006050989 A | 2/2006 | |
| WO | 2008001367 A1 | 1/2008 | |
| WO | 2008003139 A1 | 1/2008 | |
| WO | WO 2012129657 A1 * | 10/2012 | ........... A01K 29/005 |

OTHER PUBLICATIONS

Shao et al., "Comparison of image feature extraction for classification of swine thermal comfort behavior", 1998, Elsevier: Computers and Electronics in Agriculture, vol. 19, p. 223-232.*
Main, "Moo if This Hurts: The New Tech to Find Sick Livestock", Jul. 28, 2011, Popular Mechanics, <<http://www.popularmechanics.com/science/health/a6733/the-new-tech-to-find-sick-livestock/>>, last accessed Nov. 12, 2016.*
Berry et al. "Daily variation in the udder surface temperature of dairy cows measured by infrared thermography: Potential for mastitis detection", Canadian Journal of Animal Science, 2003, 83(4):687-693.
Colak et al. "Early detection of mastitis using infrared thermography in dairy cows." Journal of Dairy Science, 2008, 91 (11):4244-4248.
Cook and Schaefer. "Infrared Thermography and Disease Surveillance." In, Thermography, Current Status and Advances in Livestock Animals in Veterinary Medicine. Eds. Fabio Luzi, Malcolm Mitchell, Leonardo Nanni Costa, and Veronica Redaelli. Fondazione Iniziative Zooprofilattiche e Zootecniche Brescia 2013. ISBN 978-88-97562-06-1.
Cook et al. "Infrared Thermography of groups of pigs detects thermal responses to vaccination" Canadian Society of Animal Science and Canadian Meat Science Association Joint meeting 2013, Jun. 18-20, 2013.
Friendship et al. "Use of infrared thermography for early detection of disease causing sudden death in a swine finishing barn." pp. I27-I28 28th Annual Centralia Swine Research Update 2009. CentraliaSwineResearch.ca, Ontario.
Hovinen et al. "Detection of clinical mastitis with the help of a thermal camera." Journal of Dairy Science, 2008, 91 (12):4592-4598.
McCafferty. "The value of infrared thermography for research on mammals: Previous applications and future directions." Mammal Review, 2007, 37(3):207-223.
Schaefer et al. "The use of infrared thermography as an early indicator of bovine respiratory disease complex in calves." Research in Veterinary Science, 2007, 83:376-384.
Schaefer et al. "The non-invasive and automated detection of bovine respiratory disease onset in receiver calves using infrared thermography." Research in Veterinary Science, 2012, 93:928-935.
Schwartzkopf-Genswein and Stookey. "The use of infrared thermography to assess inflammation associated with hot-iron and freeze branding in cattle." Canadian Journal of Animal Science, 1997, 77(4):577-583.
Stewart et al. "Infrared Thermography as a non-invasive method for detecting fear-related responses of cattle to handling procedures." Animal Welfare (South Mimms, England) Oct. 2008; 17(4):387-393.
Loughmiller et al. "Relationship between mean body surface temperature measured by use of infrared thermography and ambient temperature in clinically normal pigs and pigs inoculated with Actinobacillus pleuropneumoniae." American Journal of Veterinary Research, 2001, 62(5):676-681.
Loughmiller et al. "An evaluation of differences in mean body surface temperature with infrared thermography in growing pigs fed different dietary energy intake and concentration." Journal of Applied Animal Research, 2005, 28(2):73-80.
Schaefer et al. "Non-invasive detection of infectious laryngotracheitis (ILT) in poultry using infrared thermography." Canadian Journal of Animal Science, 2008, 88(1):138.
Thompson et al. "Predicting residual feed intake in beef bulls by measuring radiated heat loss through infrared thermography." Canadian Society of Animal Science and Canadian Meat Science Association Joint meeting 2013, Jun. 18-20, 2013.

* cited by examiner

FIGURE 2

| Cluster #1 | Cluster #2 | Cluster #3 | Cluster #4 | Cluster #5 | Cluster #6 | Cluster #7 |
|---|---|---|---|---|---|---|
| 7:0 | 6:1 | 5:1:1 | 4:1:1:1 | 3:1:1:1:1 | 2:1:1:1:1:1 | 1:1:1:1:1:1:1 |
| | 5:2 | 4:2:1 | 3:2:1:1 | 2:2:1:1:1 | | |
| | 4:3 | 3:2:2 | 2:2:2:1 | | | |

INFRARED THERMOGRAPHY AND BEHAVIOUR INFORMATION FOR IDENTIFICATION OF BIOLOGICALLY IMPORTANT STATES IN ANIMALS

TECHNICAL FIELD

A non-invasive apparatus and method of identifying biologically important states in livestock is provided. More specifically, an apparatus and method is provided for combining spreading or clustering behavioral and infrared information about one or more animals to identify agriculturally important states in a group of animals.

BACKGROUND

Livestock often undergo significant exposure to transport and handling, co-mingling, auction and some time off feed and water. Collectively, such animal management events can impede the animal's immune system, impacting its welfare and performance, and creating significant health, environmental and economic concerns.

Treating livestock diseases depends upon the ability to detect, diagnose and treat animals early, and is only as effective as the information available about the animal and the reliability of that information. Most diseases are not detected until clinical symptoms are observed, by which time transmission within and between populations of animals, or between animals and humans, may well be established. Even after a problem is recognized, it is often too late to halt the spread of infectious disease throughout a herd, or to prevent the transmission to other herds, or humans. Early, accurate and effective detection and diagnosis of disease are key to disease management and treatment.

Many current disease detection methods require that the animal caregiver observe the animal on a daily basis to detect abnormal behavioural patterns or clinical signs of a non-steady state such as illness (e.g. decrease in eating due to loss of appetite). Observation methods, however, are unrealistic from both time-management and economic perspectives for a producer to regularly inspect individual animals, particular in large agricultural operations. The best that can be relied on are knowledgeable barn staff, diligent in spotting the behavioural signs, which is inaccurate, impractical and far from ideal. Further, traditional clinical signs of disease provide poor diagnostic results because clinical symptoms often occur late into the course of the illness.

More accurate diagnostic techniques are known, such as the use of acute phase proteins or hematology assessment, but they require the capture and invasive in vivo collection of biological samples, which result in the significant cost of analysis and time. The requirement of the capture (and therefore restraint) of the animal in order to collect a biological sample causes stress, and the process itself is therefore introducing inaccuracies into the data collected.

Recent research has focused on alternative approaches to non-invasively determine the early identification and onset of disease in livestock. One such approach is infrared thermography (IRT), which can be used as a means of detecting the dissipation of heat in animals without having to come into contact with the animal. Thermography operates on the principle that infrared radiation can be utilized to observe radiated heat loss and to provide an early indicator of fever because up to ~60% of the heat loss from an animal can occur in infrared ranges. The technology has been demonstrated to be effective in non-invasive identification of transport and other environmental stressors that can alter an animal's heat loss. Importantly, changes in radiated heat losses can be detected several days prior to the onset of clinical symptoms.

IRT information from a hand-held camera has been used to predict illness in animals late into the disease (e.g. two days prior to mortality within the group). However, taking thermal images with a hand-held camera compromises the precision and accuracy of the measurements with large variations in camera-to-subject distances and angles. Known IRT techniques thus prove impractical from a disease surveillance perspective because they require the camera operator to visit the same pens at least daily, and much more frequently if the efficacy of the measurement is to be optimized. These methods also fail to accurately obtain images of groups of animals, due to losses in sensitivity when changes in the temperature of an individual animal are masked by the temperature of the group. Environmental and other factors, e.g. metabolic responses to feed consumption, or circadian rhythms in body temperature are also not accounted for, resulting in data being skewed by the group's surroundings e.g. floor, walls and the inclusion of irrelevant information.

One method to improve the accuracy of IRT information in animals has been to combine the IRT data with behavioural biometrics for the early detection of non-steady states in animals. In PCT/CA2012/000279, IRT information was measured in individual animals and combined with behavioural fidgeting information to detect non-steady states in those animals. Fidgeting behaviour, however, is observed in individual animals and cannot be used to accurately and effectively detect the health and performance of groups of animals.

There is therefore a need for non-invasive, early and accurate means of identifying biologically important states, such as non-steady states in individual animals within a group. Furthermore, there is a need for a non-invasive detection means that are capable of identifying diseased animals, even in populations where there may be a low prevalence of the disease.

SUMMARY

The present apparatus and method provides for the use of real-time automated, non-invasive infrared thermography and behavioural information about a group of animals for predicting non-steady states in individual animals within the group. More specifically, the present system and method provide for the use of thermal images to simultaneously obtain both temperature and behavioural information about one or more animals at a time, and to utilize that information to determine biological states of the animal within the group. The combination of thermal biometric data, such as infrared thermography, and behavioural biometric information, such as grouping or clustering behaviour, can be used to detect early-onset of biological non-steady states in animals or steady states in animals.

Broadly speaking, a method for identifying important biological states in individual animals within a group of animals is provided, the method being, in whole or in part, automated and comprising providing an infrared camera for simultaneously obtaining infrared thermography images and behavioural information from one animal within the group, and processing the images and behavioural information about the animal to determine biological states in the animal. The behavioural information may comprise spreading or grouping (clustering) behaviour. The biological states may comprise a disease state, a non-steady state growth period, the onset of puberty, or the onset of estrus. The behavioural information may be determined by measuring the spatial distribution of the animals within the group.

Broadly speaking, an apparatus for identifying biological states in an animal is provided, the apparatus comprising at least one infrared thermography camera for obtaining infrared thermography information and behavioural information about the group of animals, and a processor for receiving the information and operative to identify biological states in individual animals within the group. The behavioural information may comprise spreading (clustering behaviour). The biological states may comprise a disease state, a non-steady state growth period, the onset of puberty, or the onset of estrus. The behavioural information may be determined by measuring the spatial distribution of the animals within the group.

FIGURES

Figure 3:
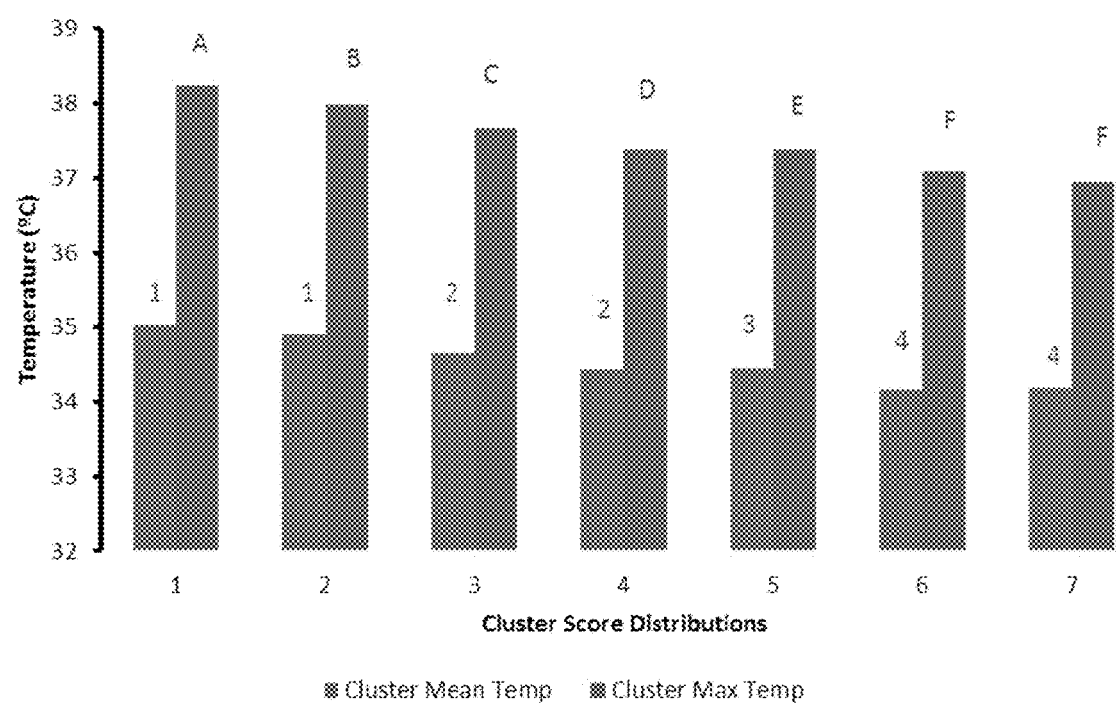
Figure 4:
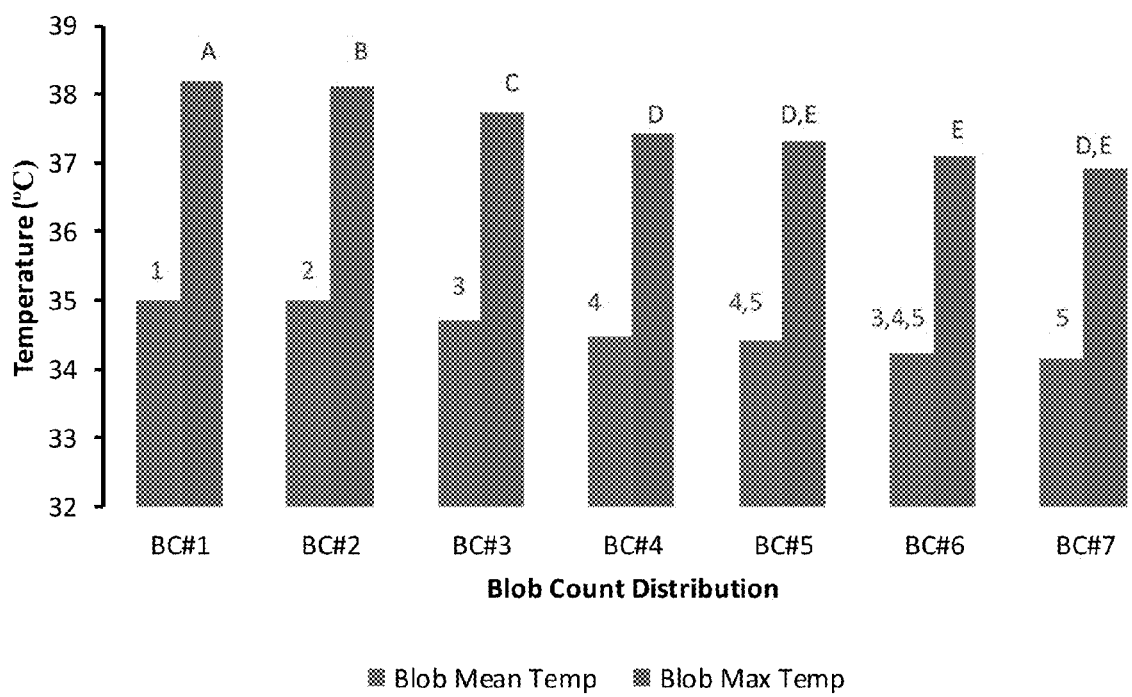
Figure 5:
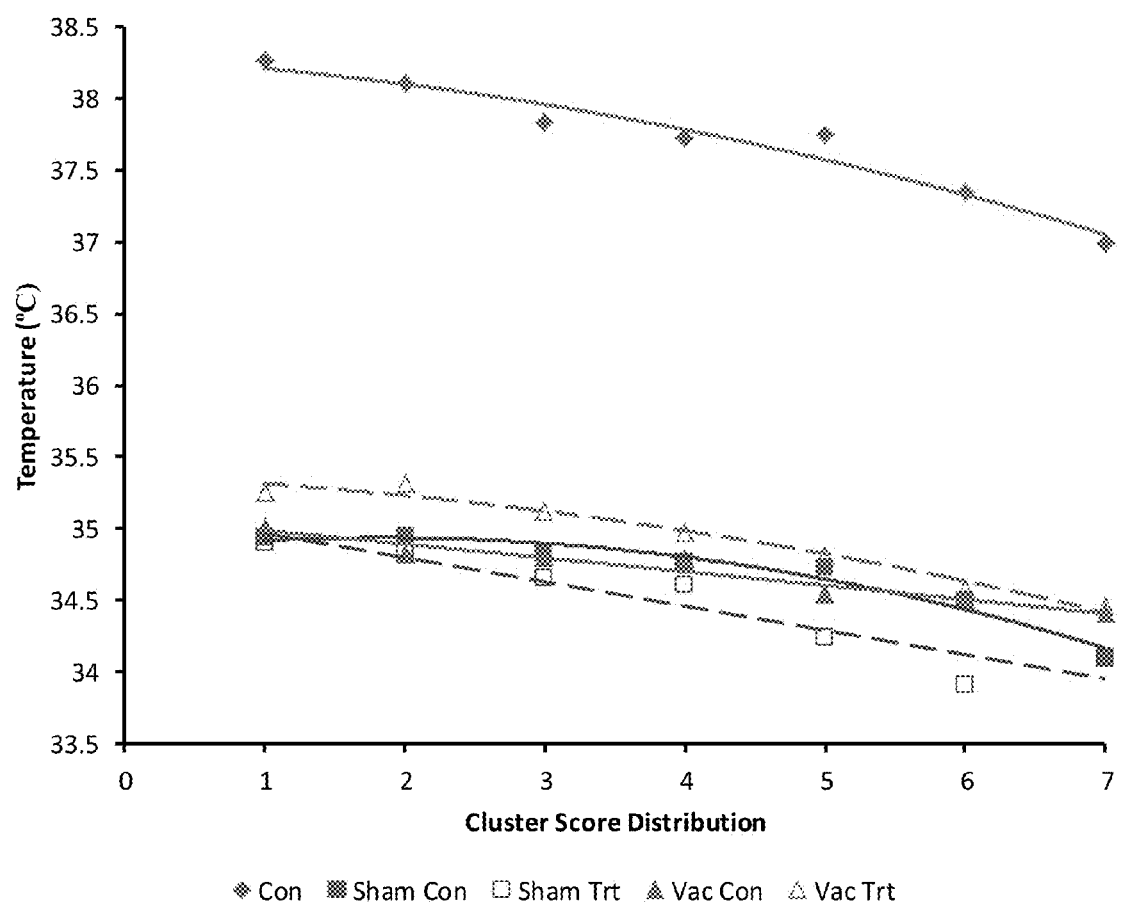
Figure 6:
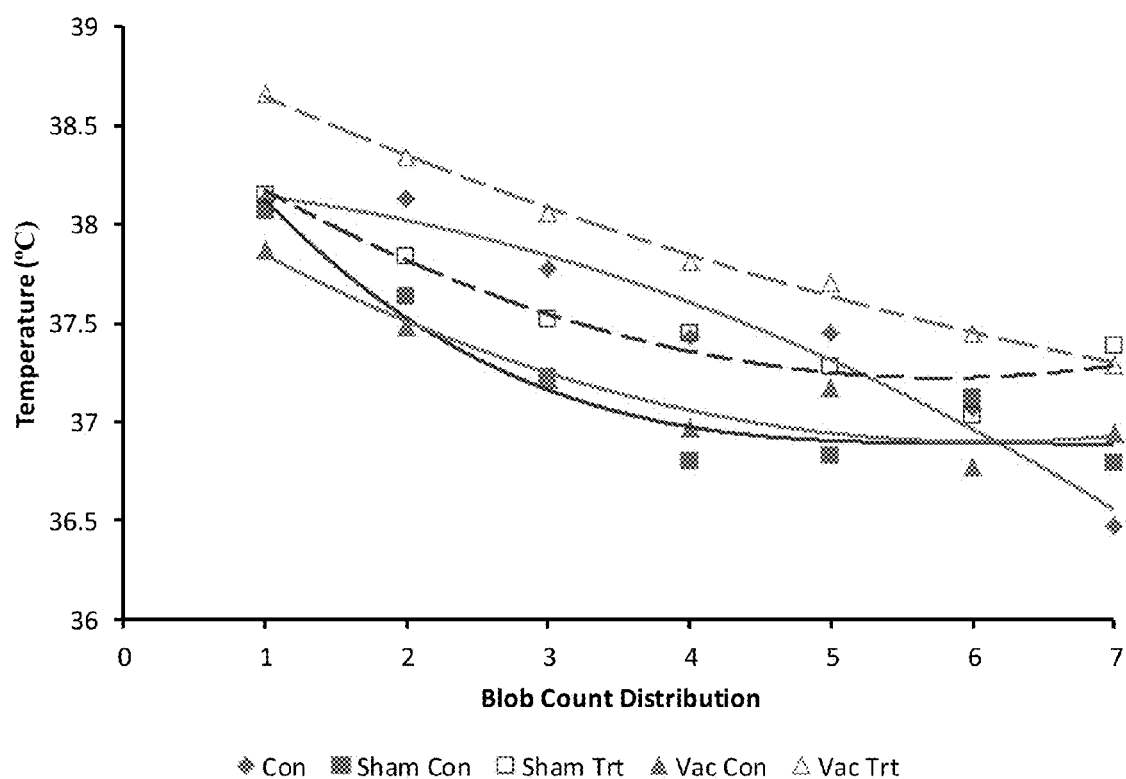
Figure 7:
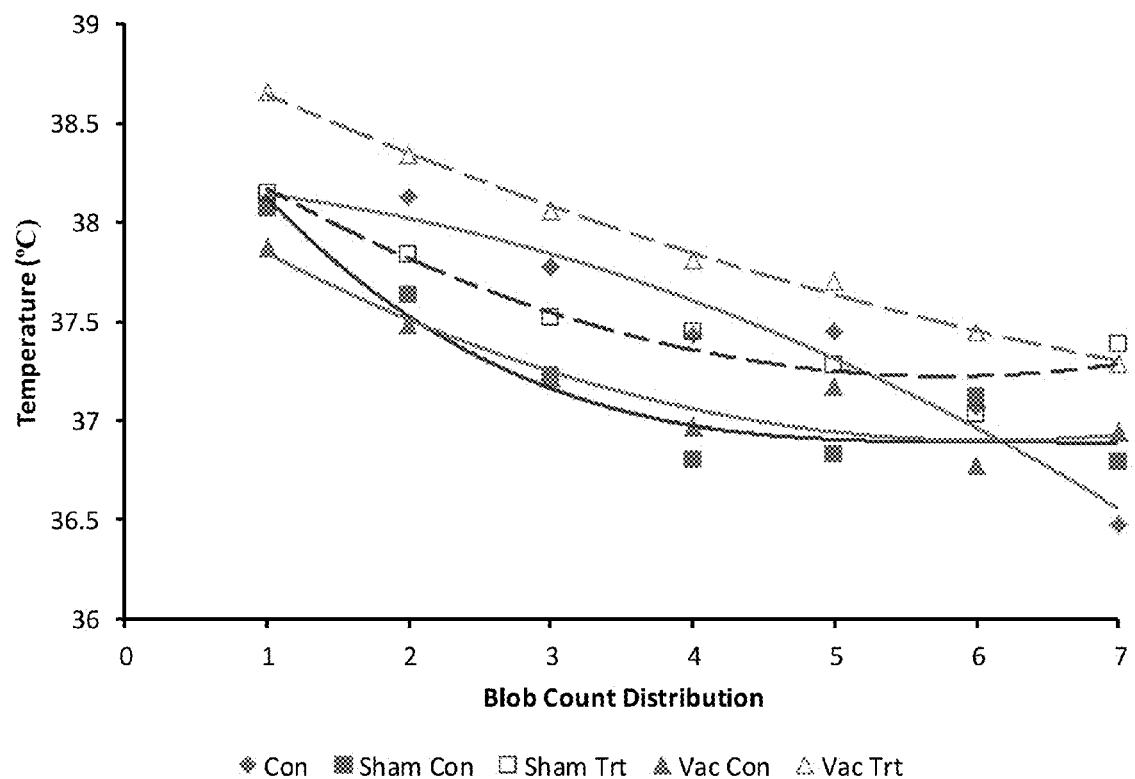
Figure 8:
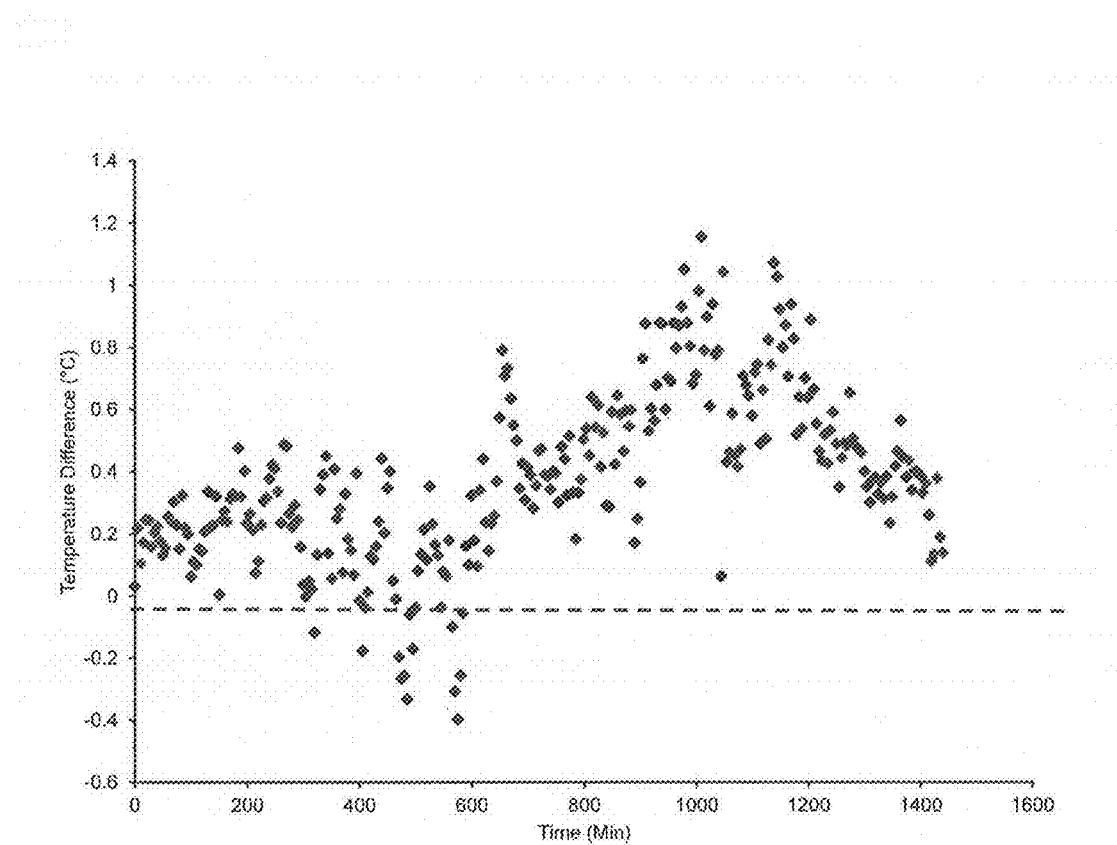

FIG. 1 shows thermal images used to determine spatial distribution of a group of animals;

FIG. 2 provides the average maximum temperatures of all treatment groups (shown, for simplicity, as the mean for 30 minute sampling periods);

FIG. 3 shows the average of the daily mean and maximum image temperatures by Cluster Scores according to an embodiment herein, FIG. 4 shows the average daily mean and maximum image temperatures for within 'Blob Counts' according to an embodiment herein, FIG. 5 provides the daily average maximum image temperature for treatment groups by 'Cluster Score' according to an embodiment herein;

FIG. 6 provides the daily average of maximum image temperature for Treatment Groups by 'Blob Count';

FIG. 7 provides the percentages of images for 'Cluster Scores' within Treatments, and FIG. 8 shows the mean temperature difference parameter at each 5 min sampling interval for all levels of prevalence.

DESCRIPTION OF EMBODIMENTS

An apparatus and method of early detection of biologically important states in animals, such as livestock, is described. In some embodiments, the biologically important states can be agriculturally important states. Using embodiments described herein, an automated system is provided capable of capturing simultaneous radiated temperature and behavioural information from individual animals and a population of group-housed animals. The present system is further capable of capturing other environmental factors such as air temperatures (thermal neural zones), humidity etc.

It is desired that information collected by the present system be used to detect temperature changes in animals that occur due to the environment, steady-state changes such as growth curves, and non-steady states that can be driven by immune challenges. More specifically, it is desired that the present apparatus and method combine thermal and behavioural biometric information for the early identification of disease (e.g., the onset of febril responses), growth efficiency, puberty, or estrus.

While the present disclosure generally relates to pigs, it would be understood by one skilled in the art that the apparatus and methods provided herein may be utilized to detect disease in any domestic ruminant and monogastric animals, such as livestock including, but not limited to cattle, horses, and domestic ungulates and fowl.

In the present apparatus and method, automated thermal and ethological data may be collected simultaneously using at least one IRT camera and software system. Thermal data can be used in conjunction with predictive or diagnostic infrared values, alongside ethological (behavioural) indicators of spreading and grouping behaviour of animals in an enclosure, wherein both the infrared values and clustering behaviour are both determined from the same IRT thermal camera image data.

The present system provides an imaging system capable of automatic recording of images (e.g., thermal images) on groups of penned animals, and on individual animals as identified by animal identification means. The present system is operative to integrate information from multiple cameras positioned at various areas throughout an animal enclosure, each camera connected to a central processor capable of receiving information from the cameras and identification information about each animal in the enclosure. As would be understood by one skilled in the art, an enclosure can comprise any area or structure which accomplishes the functions described herein. It is desired that the camera positioning provide accurate infrared thermography images about the animals without having to restrain or reduce the animal's movement. The processor may be remotely monitored and controlled, for example via an internet connection.

In one embodiment, the present system comprises at least two standard, commercially available infrared imaging cameras, corresponding equipment and computer software (e.g., radiometric cameras, FLIR A300 series). Temperature data from the cameras, typically comprising an image comprising a plurality of pixelated data points, can be processed by a central processor, which may comprise any suitable modern and compatible computer and software. The cameras may be activated automatically via motion sensor, and may be connected to an Ethernet switch located at the central hub via a 10 BaseT Ethernet connection.

The cameras may be mounted in gestation, nursery and commercial barns. Cameras may be mounted in any position as would be acceptable to observe the animals including on the ceiling or at a feeding station. For example, cameras may be positioned at or near troughs of automated feeders.

The present system further comprises animal identification means such that images taken from different animals can be distinguished (e.g., ear tags, RFID tags, pain or other markings, implanted tags, or the like). Animal identification means may be mounted at or near the cameras. In one embodiment, the present system comprises radio frequency identification (RFID) transponder, each having a unique digital identification tag and a sensor coupled thereto, and at least one reader, such as a panel reader (Alflex EID System) capable of transmitting radio frequency signals and reading said signals. The tag information from the panels may be communicated to an Ethernet converter (B&B Electronics), which may multiplex the signal from the readers and connected to one of the ports on the Ethernet switch.

Camera and animal identification information may be transmitted to the central processor with an Ethernet connection back to the switch in the central hub. The processor may be programmed to run any relevant internet-based program, e.g., "Anyplace Control", and may be operative to process live video of thermal images and current temperature data. The system may be remotely controlled, including management of the thermal images via the camera position, angle, focus and emissivity.

The spatial distribution of animals in a group can have two potential consequences: a) the spatial distribution may affect the temperature variables as animals cluster (huddle) together, with single clusters exhibiting higher temperatures than animals that are distributed individually; and b) clustering behavior can be a marker of thermal responses to immune challenge. The distribution of animals can be assessed using a cluster score, resulting in the quantification of the spatial distributions of animals within each thermal image. Methods of assessing the clustering behavior of pigs can either be visual inspection of the images involving counting the pigs and interpreting the clustering behavior, providing a "Cluster Score", or an automated method in which the heat outline associated with pigs were traced by a computer program, providing a "Blob Count." The manual 'Cluster Score' method can be used to provide an accurate assessment of the spatial distribution of animals, serving as a standard to which the computerized Blob Count method may be compared. Background temperature can be removed from the computerized Blob Count, and temperature measurements can be observed for each of the Blobs in the images.

In one embodiment, the present apparatus and method provide for the capture of automatically obtained infrared images about a group of animals (e.g., every 5 minutes), regardless of the particular biological state exhibited by the animals. Video images may be taken to continuously record the animals. Thermal biometrics may be based upon the maximum temperature or the average animal temperature as obtained above a threshold value (as may be derived from an algorithm to eliminate background environmental temperatures at the time an image is taken). Behavioural biometrics may be simultaneously coded directly from the same time-stamped thermal images taken to determine the number of animal groupings or cluster, and the number of animals within each cluster. The behavioural information can then be processed along with the animal's temperature information to determine grouping behaviour and the temperature within the group as biological states of the animals within the group changes. It is desired that the present apparatus and method may be used to automatically and rapidly detect the early onset of biologically important states in animals, including for example, the early onset of febrile responses to disease, growth phases, or reproductive and estrus states.

It is contemplated that the present automated and remotely controlled system can be built and used to record radiated temperatures and behaviour in individual animals and groups of animals. Thermal responses from one animal may be detected by group images. For example, a thermal change or response in a group of animals may be detected at less than 10% prevalence within the group. The present apparatus and method may therefore enable livestock producers to monitor and control temperature of groups of animals, and to use IRT in combination with grouping or clustering behaviour as an early indicator of the animal's health and welfare.

Thus, the present apparatus and method can provide for the use of infrared thermography images to be used to detect the peripheral temperature of the animal as well as the behavioural activity of the same animal, providing earlier and more accurate disease detection and state identification. It is understood that the present apparatus and method can provide for two distinct sets of data or information to be generated in parallel or series. It would also be apparent that these two biometric data sets consisting of both infrared and grouping information can be used in a number of statistical assessment procedures including multiple regression and correlation, ranking and prediction indexes to enable the more accurate identification of true-positive and true negative animals. Such detection and identification means are likely to be applicable in a variety of settings, including, for example, in bio-security and bio-surveillance circumstances.

The following examples are provided to aid the understanding of the present disclosure, the true scope of which is set forth in the claims. It is understood that modifications can be made in the system and methods set forth without departing from the spirit or scope of the same, as defined herein.

EXAMPLES

Example 1—Measurement of Group Temperature by IRT and the Relationship to Immune Challenge The present example was designed to assess thermal responses brought about by an immune challenge in a group of animals using IRT images. In this case, infrared images were taken from a group of pigs (automatically recorded at regular intervals) and the temperature information was used to determine immunologically challenged animals within the group.

Newly weaned piglets (Mean±SD weight=8.91±1.06 kg) were housed in groups of seven in a pen measuring 6×4 feet (24 sq ft.). Pigs were given ad libitum access to water and creep feed and an electrolyte solution. The vaccination treated group (VAC) received an intramuscular injection of the vaccine FarrowSure B+, and in the three latter replications the vaccine was FarrowSure Gold. These are a 3-way vaccination for porcine parvovirus (PPV), erysipelas caused by Erysipelothrix rhusiopathiae, and leptospirosis caused by *Leptospira bratislava, L. canicola, L. grippotyphosa, L. hardjo, L. icterohaemorrhagiae*, and *L. pomona*. The FarrowSure vaccines were unavailable for two replications and were substituted with J-Vac® vaccine (Merial Canada Inc) for prevention of mastitis due to *E. coli* and the effects of endotoxemia caused by *E. coli* and *Salmonella typhimurium* in cattle. A sham treatment group received an intramuscular injection (2 ml) of 0.9% saline and a third group were control animals (CON) that did not receive any treatment.

Infrared images were recorded at 5 minute intervals, for up to 4 days. Images recorded over the first 24 hour period following treatments were designated Vac Trt and Sham Trt, allowing for the comparison of responses within and across treatment groups. Infrared images of groups of animals were taken using a radiometric infrared camera mounted on the ceiling of the nursery barn directly overhead of the test pen, and included parts of the surrounding pen, including the floor, walls, feeder, and electrolyte solution, as well as less consistent variables such as the heat imprint of the pigs on the floor, heat reflections of pigs on the walls, recent depositions of urine or feces, and occasionally the presence of mice in the pen.

Thermographic images were analyzed for temperature variables using ThermoCAM Research Pro 2.7 (Flir Vision Systems), which allows for temperature measurements for the whole image or parts of the image that are delineated using shapes or free-drawing tools. The temperature data obtained from the images are the minimum, maximum and mean.

Attempts were made to eliminate background variables by setting a threshold temperature that removed the background and permitted measurement of the mean pig temperature. More specifically, the maximum temperature in the images was nearly always associated with the pigs, with rare exceptions were reflections off the feeder of radiated heat from the overhead heater. Most variation occurred in the minimum and mean temperatures because these were affected by variables other than those associated with the pigs. It was therefore evident that removing the background temperatures was key to obtaining an accurate measure of the temperature variables associated solely with the pigs.

The spatial distribution of pigs within the pen can have two potential consequences: a) the spatial distribution may affect the temperature variables as pigs huddled in a single cluster can exhibit higher temperatures than pigs that are distributed individually throughout the pen; and b) clustering behavior can be a marker of thermal responses to immune challenge. Therefore, the distributions of pigs were assessed using a cluster score, resulting in the quantification of the spatial distributions of pigs within each thermal image. FIG. 1 shows examples of the spatial distributions of pigs, and the effect on the average maximum temperature, demonstrating that as the spatial scatter of Blobs increased the maximum temperature decreased. Methods of assessing the clustering behavior of pigs were either visual inspection of the images involving counting the pigs and interpreting the clustering behavior (Cluster Score), or an automated method in which the heat outline associated with pigs were traced by a computer program (Blob Count). The manual 'Cluster Score' method provided an accurate assessment of the spatial distribution of pigs and was the standard to which the computerized Blob Count method was compared. The computerized method involved removing the background temperature using the BTT and counting the numbers of Blobs within the images. Temperature measurements were made for each of the Blobs in all images.

More specifically, a representation of the spatial distribution of pigs within the image is given by the Cluster or Blobs counts, i.e. 1 to 7. If all pigs were touching and huddled into one area of the image then CS=1, and if all pigs were individually distributed throughout the image then CS=7. Thus individual pigs could be a 'Cluster'. However, if 2 pigs were touching by standing and aligned end-to-end they were not considered to be clustering unless a minimum of half of their body lengths were in contact. As such, it was recognized that the distribution of pigs within the same CS category could be different. Thus, there could only be one possible distribution if the image has 1, 6 or 7 Clusters/Blobs but images in which there were 2, 3, 4 and 5 Clusters/Blobs can have 2 or 3 different distributions of pigs. For example, CS=2 can have possible distributions of 6+1, 5+2, and 4+3. The Cluster scoring was a relatively simple method of representing spatial distribution but served the purpose of testing if spatial distribution affected the measured temperature. High and low clustering activities were defined by combining CS1, CS2 and CS3 into a high CS group (HCS), and CS4, CS5, CS6 and CS7 into a low CS group (LCS). Thus, HCS was indicative of inactivity (usually sleeping) and LCS was indicative of activity. Permutations for the distributions of pigs within Clusters/Blobs are given in FIG. 2. These permutations become important for comparing the relative accuracy of Cluster and Blob counts.

The present Example 1 analysed whether an immunological challenge by vaccination had an effect on radiated temperature determined from infrared images of groups of animals. In the vaccinated (Vac) and control (Sham) treatments each image was given a time (min) relative to the administration of the vaccine or saline injection (Time 0), as automatically recorded by the camera. Similarly, in the Control treatment Time 0 was taken as the sample collected at the same clock time as the Time 0 image in the Vac treatment. Thus, it was possible to match and compare correspondingly timed samples across treatment groups. In the Sham and Vac treatments the images used for the assessment of temperature responses to treatments were those taken immediately after the administration of saline or vaccination and up to 1440 minutes post-administration, i.e. 24 hours. Images were recorded at 5 minute intervals for all groups (FIG. 2).

Environmental effects on the measurement of animal temperature was assessed by recording of air temperature, humidity, air pressure and heat index at 10 minute intervals over 9 trials, as measured by a weather meter positioned above the pen but out of the frame of the infrared camera. This amounted to a total of 5358 paired data points between animal and environmental measurement parameters. Analysis of the spatial distribution of pigs and the effects on temperature measurements were based on 8 replications of the experiment, giving a total of 10,791 images. Of these there were 8980 images with matched Cluster Score and Blob Count.

FIG. 3 shows the average of the daily mean and maximum image temperatures by Cluster Scores, and FIG. 4 shows the same for temperature parameters within Blob Counts. The average maximum and mean image temperatures for Cluster Scores and Blob counts were tested for differences by standard least squares analysis of variance. Cluster Score and Blob Counts were significant effects for maximum and mean image temperatures ($P<0.0001$). In FIGS. 3 and 4 differences in the maximum image temperature between distributions is indicated by different letters, and differences between distributions for the mean image temperatures are indicated by numbers. Columns not sharing the same letter or number were significantly different ($P<0.05$). The highest temperatures for the image mean and maximum temperature variables were in images in which the pigs were grouped into a single Cluster/Blob, and as the spatial arrangement became more scattered there was a decline in the temperature variables. These data indicated that the most responsive temperature variable was the maximum image temperature.

The effect of spatial distribution was further examined within Treatment groups. FIGS. 5 and 6 show the daily average maximum image temperatures for Treatment groups by Cluster Score (FIG. 5) and Blob Counts (FIG. 6). There were significant effects of Treatment within Cluster Score ($P<0.0001$) and Treatment within Blob Count ($P<0.0001$). The differences between the control conditions (Vac Con and Sham Con) and the post-treatment conditions (Vac Trt and Sham Trt) tended to converge with increasing spatial distribution. This suggested that the response to treatment was probably best indicated by using only those images in which the pigs were grouped into a single Cluster/Blob.

Treatment effects on clustering behaviour were also analysed. FIG. 7 shows the percentage of images within Cluster Scores between Treatment Groups. The CS#1 score is evenly distributed among Treatments but as the Cluster Scores increase they were less evenly distributed. Cluster Scores #5, #6 and #7 occur more frequently in the Control group and less frequently in the Vaccination group. Statistical analyses of these distributions among Treatments were based on the characterization of Cluster scores as ordinal data. Thus, ordinal logistic analysis gave Chi-square values that indicated significant differences ($P<0.0001$) in the distribution of Cluster Score among Treatments. The Vac group exhibited relatively fewer images with Cluster scores #5 #6 and #7. Thus, Control animals demonstrated greater activity than Vac and Sham animals. There were no differences in the distributions of Cluster scores between Vac and Sham group.

This may indicate that the lower incidence of active behaviours (higher Cluster scores) in these groups may be a stress effect rather than one of immune challenge. The use of infrared images as a behavioural tool to assess activity was also considered by plotting the percentage of #1 Blobs by Clock Time, and confirmed a distinct pattern of Blob #1 images in which the highest percentages of this distribution occurred when the lights were out, indicating greater sleeping activity during this time.

The effect of Clustering on temperature variables was mitigated by limiting the assessment of Treatment effects to images with a Blob #1 distribution of pigs. In the Sham and Vac treatments, the images used for the assessment of temperature responses to treatments were those taken immediately after the administration of saline or vaccination and up to 1440 minutes post-administration, i.e. 24 hours. The mean (±SD) of the maximum image temperatures over the 24 hours post-vaccination period (38.65±0.89° C.) was significantly higher ($p<0.0001$) than for the equivalent Vac Con (38.03±0.89° C.) and Con (38.18±1.02° C.) groups. There were no significant differences in the average daily maximum temperature between the Con, Sham Con and Sham Trt groups.

The 30-minute average for the maximum image temperature for each of the treatment groups over 10 replications of the experiment was also determined. Thus, the temperature at each time point represents a minimum of 42 images for the Sham Con and Vac Con images and up to 120 images for the Con group. Images in the Con group were recorded over 2 days per replication (each 30 min period=10 Reps×2 days×6 images=120 images). In the Sham Trt and Vac Trt groups each time interval represented an average of 60 images (10 Reps×1 day×6 images=60 images). The average number of images for each 30 min interval for the Sham Con and Vac Con groups was 42 images (7 Reps×1 day×6 images=42 images).

The pattern of temperature responses was also monitored by comparing among specific groups, namely the temperature patterns for the Sham Trt images vs. Sham Con images. The difference in temperature between these groups was tested for each 30 min interval, and very few differences in temperature between control and post-sham treatment images were observed. However, the image temperature was higher in the Sham Trt group compared to Sham Con images at time period of 30-60 min, 60-90 min and 180-210 min. Furthermore, during the period up to 210 minutes following saline injection the Sham Trt mean (SD) temperature was 38.13 (±0.86) compared to 37.95 (±1.11) in the Sham Con images, a difference that was statistically significant ($p<0.006$). There were no other periods in which significant differences in temperature were observed between the Sham Trt and Sham Con images. This observation suggests that the temperature differences in the early samples were a response to handling and the intramuscular injection of saline. The observation strongly indicated that a stress response may induce an increase in radiated temperature. The response appears to be relatively rapid and transient compared to the response to vaccination. The stress response was apparent after 1 hour and lasted up to 3.5 hours post-stressor.

Clustering analysis revealed that the spatial distribution of pigs in group images had an effect on the measured temperature, and that vaccination had an effect on clustering behaviour such that vaccinated pigs clustered together more, and this behaviour corresponded with the peak in the maximum temperature. It is possible that vaccination caused animals to feel sick, or stressed, and derived comfort from huddling together. Or, since the vaccinated animals radiated more heat, indicating greater heat loss, animals may seek heat by huddling together.

Example 1 demonstrates that vaccination caused a significant thermal response in pigs that was evident within 3 hours of the vaccination and lasted for up to 20 hours, and that thermal images from groups of pigs could be used to detect these changes, and can provide a detection system for febrile disease. The handling and sham vaccination of pigs caused a thermal response to the stress, suggesting that thermal images may provide a marker of acute stress in pigs. Thermal imaging also provided a means of assessing the behaviour of pigs independent of the actual temperature data. This is because thermal images are easily manipulated such that the distribution of the pigs within the images can be quantified, and the distribution is related to activity. Hence, the thermal images provided a measure of activity.

Maximum image temperature and environmental variables were analysed, and a very narrow range in the environmental variables was observed because data was collected from a nursery room in which the conditions are held relatively constant. There were significant correlations between the maximum image temperature and environmental variables. However, the amount of variation in maximum temperature that is accounted for the by the environmental variables is very small (<10%). This is far less than the response to vaccination and is diagnostically insignificant, and although the correlations were significant the observations are not biologically relevant. Further analysis of the data revealed environmental variables followed a pattern of being lower at night and higher during the day. Conversely, the maximum temperature variables exhibited the opposite circadian pattern. Thus, during the day these variables are changing in opposite directions relative to one another. This explains why the appeared to be a very weak negative association between maximum temperature with air temperature and heat index.

Example 2—Diagnosing Immune Challenged Animals Within a Group

The present example was designed to examine the diagnostic sensitivity of group-temperature by modeling of prevalence within the group. Differing numbers of individual animals within a large group of animals were vaccinated. Prevalence is known in the art to be the proportion (percentage) of subjects in a population with a given disease. It is desired that the effect of prevalence for the diagnostic utility of thermal imaging of a group of subjects be determined, e.g., how many pigs in a pen need to show a thermal response before that response is detected by thermal imaging of the group.

In each replication (n=12) of the experiment, groups of weaned piglets (n=23–28) with a mean (±sd) weight of 7.94 (±2.25) kg were housed in a pen of dimensions 6×14 ft. (84 sq. ft.). Thermal images were recorded at 5 minute intervals for periods over at least 6 days and in some replications for over 20 days. After a minimum of 3 days following vaccination pigs were removed from the pen leaving behind a group of 14 animals.

Following weaning, pigs were acclimatized to the experimental pen for 3 days prior to the start of recording of infrared images. Images were recorded over three consecutive days beginning 1 day prior to vaccination (control day), the day of vaccination (Vac) or sham (Sham) treatment, and for an additional day after the treatment day. The response to vaccination was determined by comparing temperature parameters between the pre-vaccination control day and the 24-hours following vaccination. FIG. 8 shows the mean Temp Diff across all levels of prevalence, the mean level of prevalence being 39.9%. One-way ANOVA revealed a trend in the variances across the different levels of prevalence (P<0.08). A positive prevalence value meant that the temperature in the post-vaccination image was higher than the pre-vaccination image. Similarly, the bivariate fit of prevalence and 24 h mean Temp Diff indicated that the relationship could be described by a second order polynomial curve fit ($R^2$=0.33, P<0.08). Thus, there was a tendency to detect higher levels of response with greater numbers of vaccinated animals.

However, one observation was that at levels of prevalence <10% it was possible to detect an increase in the 24 h mean Temp Diff following vaccination. The sensitivity of the Temp Diff parameter to prevalence was a function of using the maximum temperature as the response variable. It only required 1 animal in a group to exhibit a higher than normal temperature for this to be detected by a thermal camera. This also explains why there was not a strong relationship between prevalence and the magnitude of the mean 24 h Temp Diff. Using the entire 24 h period after vaccination to define a response was relatively insensitive since the thermal response appeared to be mostly confined to a period of 3 h-20 h post-vaccination. Consequently, the 24 h mean response variable included temperature measurements that occurred outside of this time frame.

Provided that barn temperature is kept within the thermal neutral zone of pigs there was no need to correct the animal's temperature measurement to take into account environmental effects. However, there was a strong time of day effect on temperature that closely resembled the activity graph. Furthermore, clustering behaviour affected temperature measurements. Thus, it was important to account for these effects in modeling the response parameter. The Temp Diff parameter corrected for time of day effects because it paired temperature measurements made in real-time with time matched measurements from prior control days. The clustering behaviour effect could be eliminated by only considering images in which the animals are arranged in a single cluster. The present image analysis software can be used to automatically count clusters. Given that both temperature and clustering behaviour were indicative of treatment effects, these variables may be combined into a diagnostic index. Since the ultimate goal is to utilize IRT technology to make real-time decisions in terms of disease detection and surveillance, a faster and more accurate assessment of temperature responses would be the running average in the Temp Diff variable. This response parameter has the potential to identify a thermal response within 6-10 hours, while at the same time accounting for time-of-day effects such as sleeping behaviour and circadian rhythms. Infrared images of groups of animals can be used to detect febrile responses at low levels of prevalence, and thus have potential as a disease detection and surveillance tool in livestock barns.

The scope of the claims should not be limited by the preferred embodiments set forth in the examples, but should be given the broadest interpretation consistent with the description as a whole.

What is claimed is:

1. An automated method for use in determining thermal responses of individual animals within a group of animals, the method comprising:
   identifying an individual animal within the group of animals within an enclosure, wherein the identifying includes using a reading device to read signals generated by an electronic tag attached to the individual animal, and wherein the read signals comprise animal identification information,
   photographing the identified animal to obtain infrared thermography images about the identified animal within the group of animals, each image providing a plurality of pixelated data points, wherein the photographing includes using at least one camera positioned about the enclosure to automatically obtain the infrared thermography images,
   processing the pixelated data points in each image together with the animal identification information to determine both temperature information about the identified animal, and clustering information about the identified animal, the clustering information being quantified from the pixelated data points by tracing heat outlines of the animals to generate a score indicative of spatial distributions of the animals within the images, and
   processing the temperature information and the clustering information about the identified animal to detect a thermal response in the identified animal, wherein the thermal response of the identified animal is an early indicator of biological states in the identified animal, and wherein the biological states comprise a disease state, a non-steady state growth period, the onset of puberty, or the onset of estrus.

2. The method of claim 1, wherein the clustering information about the identified animal is determined by measuring the spatial distribution of the animals within the group.

3. The method of claim 1, wherein the method further comprises eliminating background variables from the infrared thermography images.

4. The method of claim 3, wherein the background variables may comprise at least background temperature.

5. An automated apparatus for use in determining thermal responses of individual animals within a group of animals, the apparatus comprising:
   animal identification means for identifying an individual animal within the group of animals within an enclosure, wherein the identification means includes a reading device that reads signals generated by an electronic tag attached to the individual animal, and wherein the read signals comprise animal identification information,
   at least one infrared thermography camera, positioned about the enclosure, for automatically obtaining infrared thermography images of the identified animal within the group of animals, the images providing a plurality of pixelated data points used to determine both temperature information and clustering information about the identified animal within the group of animals, the clustering information being quantified by tracing heat outlines of the animals to generate a score indicative of the spatial distributions of the animals within the images, and
   a processor programmed to receive and process the temperature information and the clustering information, together with the animal identification information, about the identified animal to determine a thermal response in the identified animal, the thermal response being an early indicator of biological states in the identified animal, wherein the biological states comprise a disease state, a non-steady state growth period, the onset of puberty, or the onset of estrus.

6. The apparatus of claim 5, wherein the apparatus further comprises means for measuring the spatial distribution of the animals within the group from the images.

7. The apparatus of claim 5, wherein the animal identification means further comprises an apparatus for identifying each animal in the group of animals.

8. The apparatus of claim 5, wherein the processor utilizes a prediction model to identify the biological states in the identified animal.

9. The apparatus of claim 5, wherein the at least one camera is capable of obtaining at least 1-60 images/second.

10. The apparatus of claim 5, wherein the images are collected at least every 5 minutes.

11. The apparatus of claim 5, wherein the processor is further programmed to eliminate background variables from the infrared thermography images.

12. The apparatus of claim 11, wherein the background variables comprise at least background temperature.

13. The apparatus of claim 5, wherein the at least one camera is activated automatically by at least one motion sensor positioned about the enclosure and coupled to the at least one camera.

\* \* \* \* \*